United States Patent [19]
Iio et al.

[11] Patent Number: 5,581,880
[45] Date of Patent: Dec. 10, 1996

[54] METHOD FOR MACHINING SCROLL MEMBER

[75] Inventors: Junichi Iio, Nishio; Yukio Yamaguchi, Okazaki; Norio Suzuki, Anjo; Shigeki Iwanami, Okazaki; Masaaki Enya, Toyohashi; Yukihisa Tsuchimoto, Kariya; Tomomi Ohno, Kariya; Shinya Yamamoto, Kariya; Yasuhiro Miura, Kariya, all of Japan

[73] Assignees: Nippondenso Co., Ltd.; Kabushiki Kaisha Toyoda Jidoshokki Seisakusho, both of Kariya, Japan

[21] Appl. No.: 427,962

[22] Filed: Apr. 26, 1995

[30] Foreign Application Priority Data

Apr. 28, 1994 [JP] Japan ................................. 6-092672

[51] Int. Cl.$^6$ ............................... B23P 15/02; B23C 3/12
[52] U.S. Cl. ................................. 29/888.022; 409/132
[58] Field of Search ................. 29/888.022, 888.02, 29/888.021; 409/80, 131, 132; 451/47, 58; 418/55.2

[56] References Cited

U.S. PATENT DOCUMENTS

| 4,666,380 | 5/1987 | Hirano et al. ................. 29/888.022 |
| 4,690,625 | 9/1987 | Murayama et al. ........... 29/888.022 X |
| 4,696,084 | 9/1987 | Hirano et al. ................. 29/888.022 |
| 5,103,558 | 4/1992 | Herrick et al. ................. 409/132 X |
| 5,122,040 | 6/1992 | Fields ............................ 29/888.022 X |

*Primary Examiner*—William R. Briggs
*Attorney, Agent, or Firm*—Cushman, Darby & Cushman

[57] ABSTRACT

A method for shaping a scroll member for a scroll compressor, capable of increasing a service life of a cutter tool, while reducing the cost. At the corner between the base plate 2 and a scroll wall, a roundness 3a of a small radius R1 of curvature is first machined along an entire length of the scroll wall in its spiral direction. Then, a roundness 3b of a large radius R2 of curvature is machined only at a spirally inner end of the scroll wall.

5 Claims, 9 Drawing Sheets

Fig.3
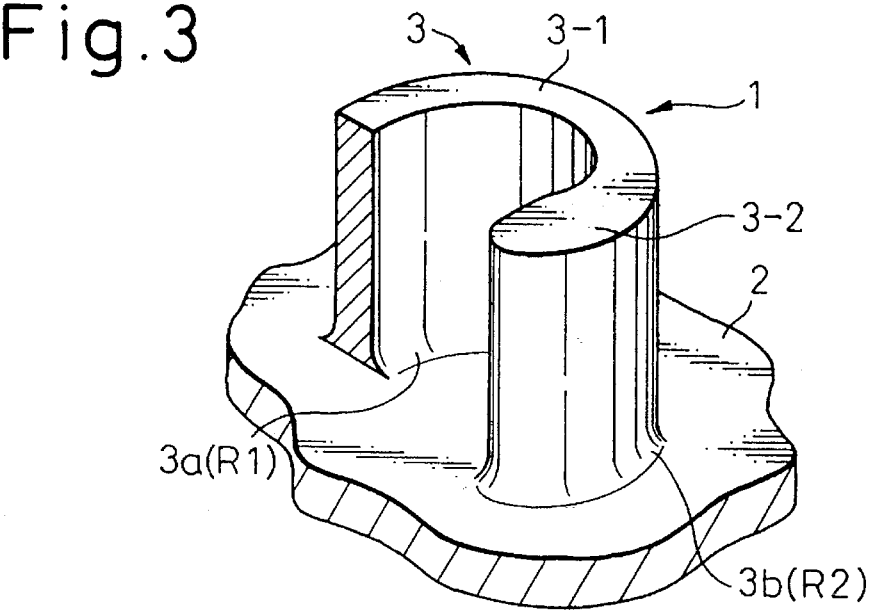
Fig.4-A
(Prior Art)
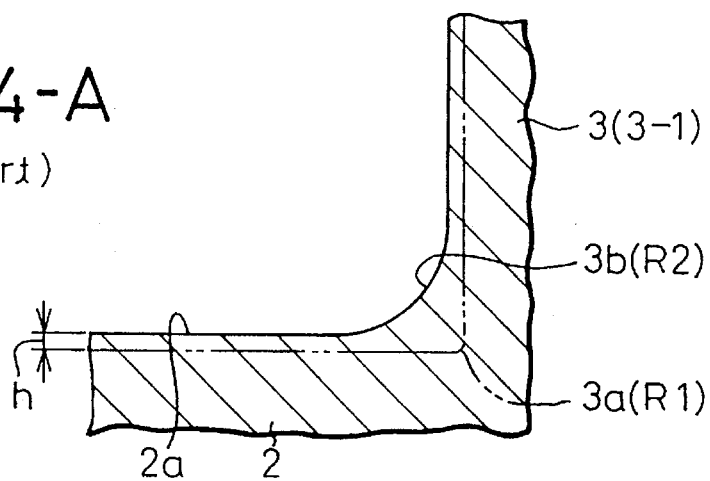
Fig.4-B
(Prior Art)
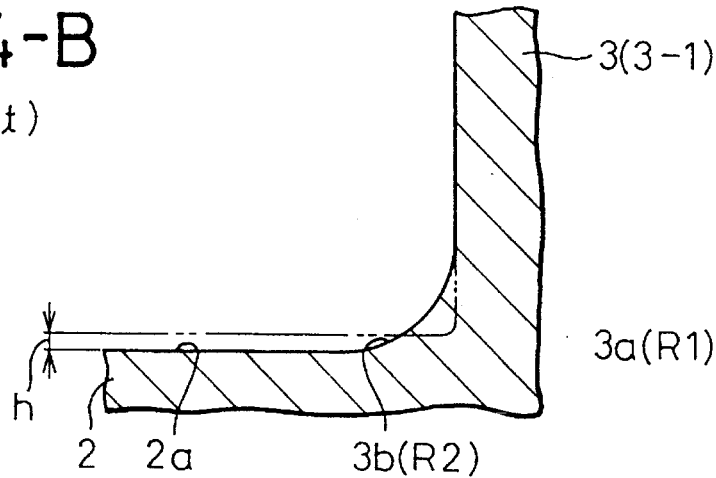

Fig.5-A
(Prior Art)
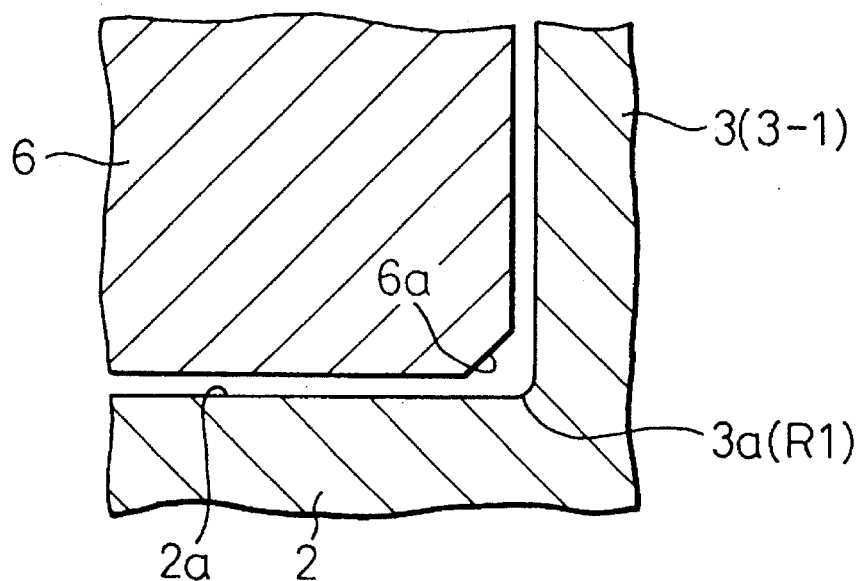
Fig.5-B
(Prior Art)
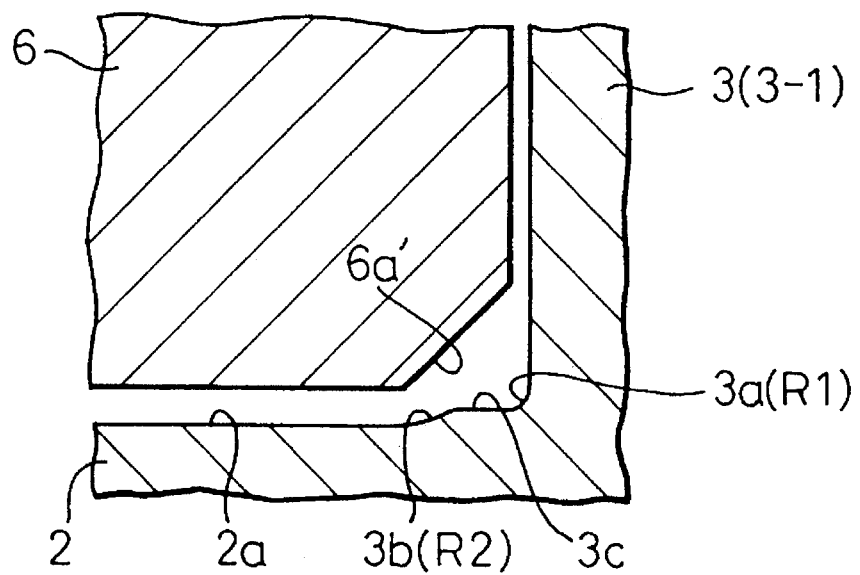

METHOD FOR MACHINING SCROLL MEMBER

BACKGROUND OF THE INVENTION

1. Field of the Invention

The present invention relates to method for machining a scroll member for a scroll compressor which can, for example, be used in an air conditioning system.

2. Description of Related Arts

A scroll compressor includes a stationary scroll member fixedly arranged in a housing and a movable scroll member which is movably arranged in the housing. The stationary scroll member is formed with a base plate and a scroll wall extending axially therefrom. Similarly, the movable scroll member is formed with a base plate and a scroll wall extending axially therefrom. The scroll wall of the stationary scroll member is in axial contact with the base plate of the movable scroll member, while the scroll wall of the movable scroll member is in axial contact with the base plate of the stationary scroll member.

In the scroll member for the scroll compressor, a corner portion, where the base plate is connected to the scroll wall, is usually rounded for strengthening the member. The radius of the curvature of the rounded corner is increased at a radially inner end of the scroll. This is for increasing a strength at the radially inner end of the scroll wall where a force applied thereto, during compression, becomes high.

Since the rounded corner of the scroll wall has a different radius of curvature between the radially inward position and the radially outward position, a two stage machining of the corner portion between the scroll wall and the base plate of the scroll member is necessary. However, a prior art method for doing this is defective in that a machining tool is quickly worn.

SUMMARY OF THE INVENTION

An object of the present invention is to provide a method machining a corner between the scroll wall and base plate, capable of increasing the service life of a machining tool.

According to the present invention a method for machining a scroll wall having a base plate and a scroll wall extending axially from the base plate, the scroll wall extending, also, in a spiral direction, from a radially outer end to a radially inner end, so that a corner is formed between scroll wall and the base plate along the spiral direction, said method comprising steps of:

machining the corner along the entire length of the scroll wall along the spiral direction, so that the corner is machined to a rounded shape of a first radius of a curvature, and;

after the completion of the machining of the first value of radius of a curvature, machining the corner only at the radially inner end, so that the corner is machined to a rounded shape of a second radius of a curvature, which is larger than the first radius of a curvature.

BRIEF DESCRIPTION OF ATTACHED DRAWINGS

FIG. 3 is a schematic perspective view of a scroll member in FIG. 1.

FIG. 4-A is a cross-sectional view illustrating a method of machining in a prior art.

FIG. 4-B is similar to FIG. 4-A, but illustrates an error in the feeding of a cutting tool.

FIG. 5-A shows the relationship between a rounded portion and a bevelled portion between the scroll walls of the scroll members in the prior art.

FIG. 5-B is similar to FIG. 5-A, but illustrates an error in the feeding of a tool.

Figure 6:
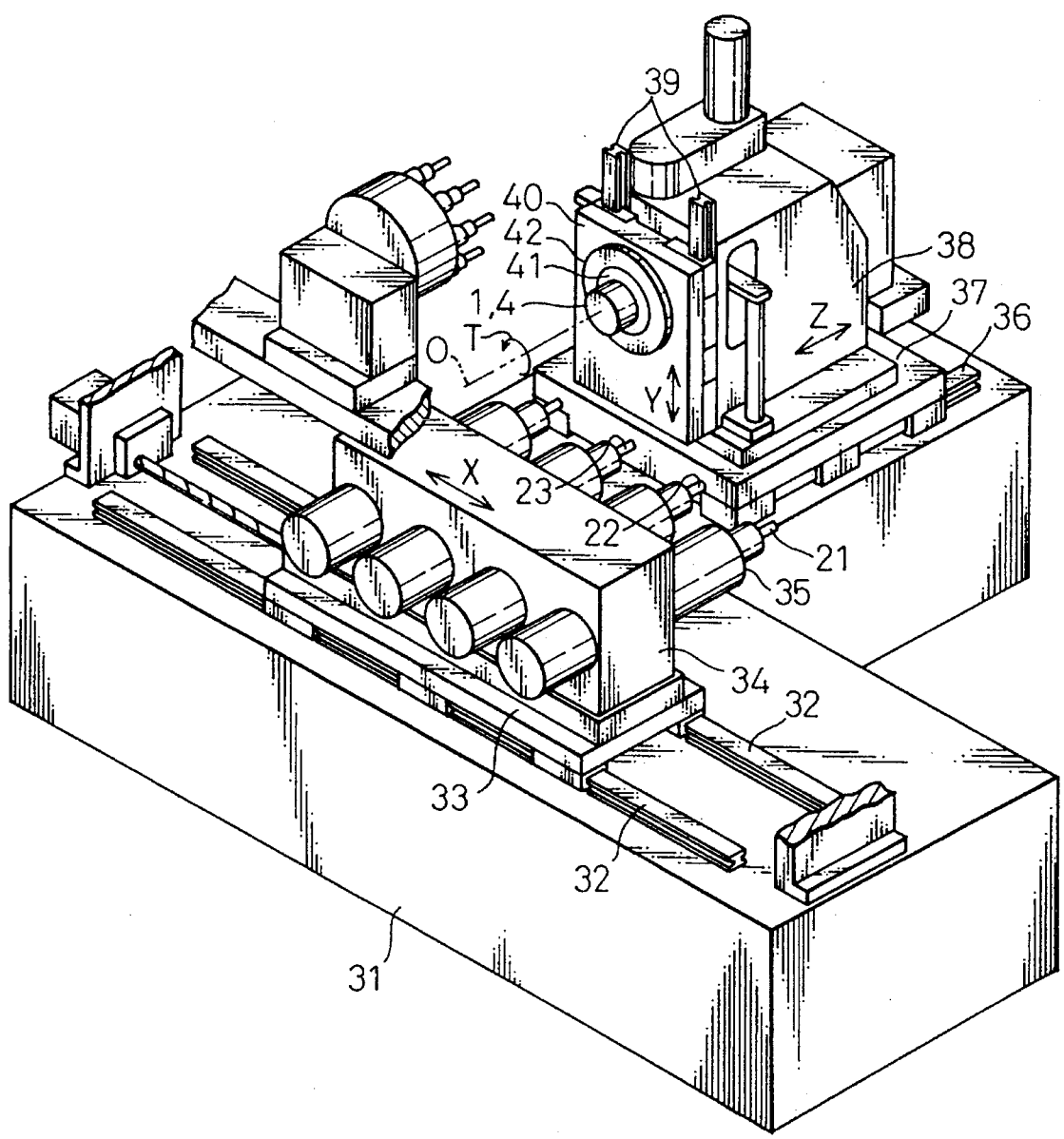

FIG. 6 is a schematic perspective view of a device for machining the scroll member.

Figure 7:
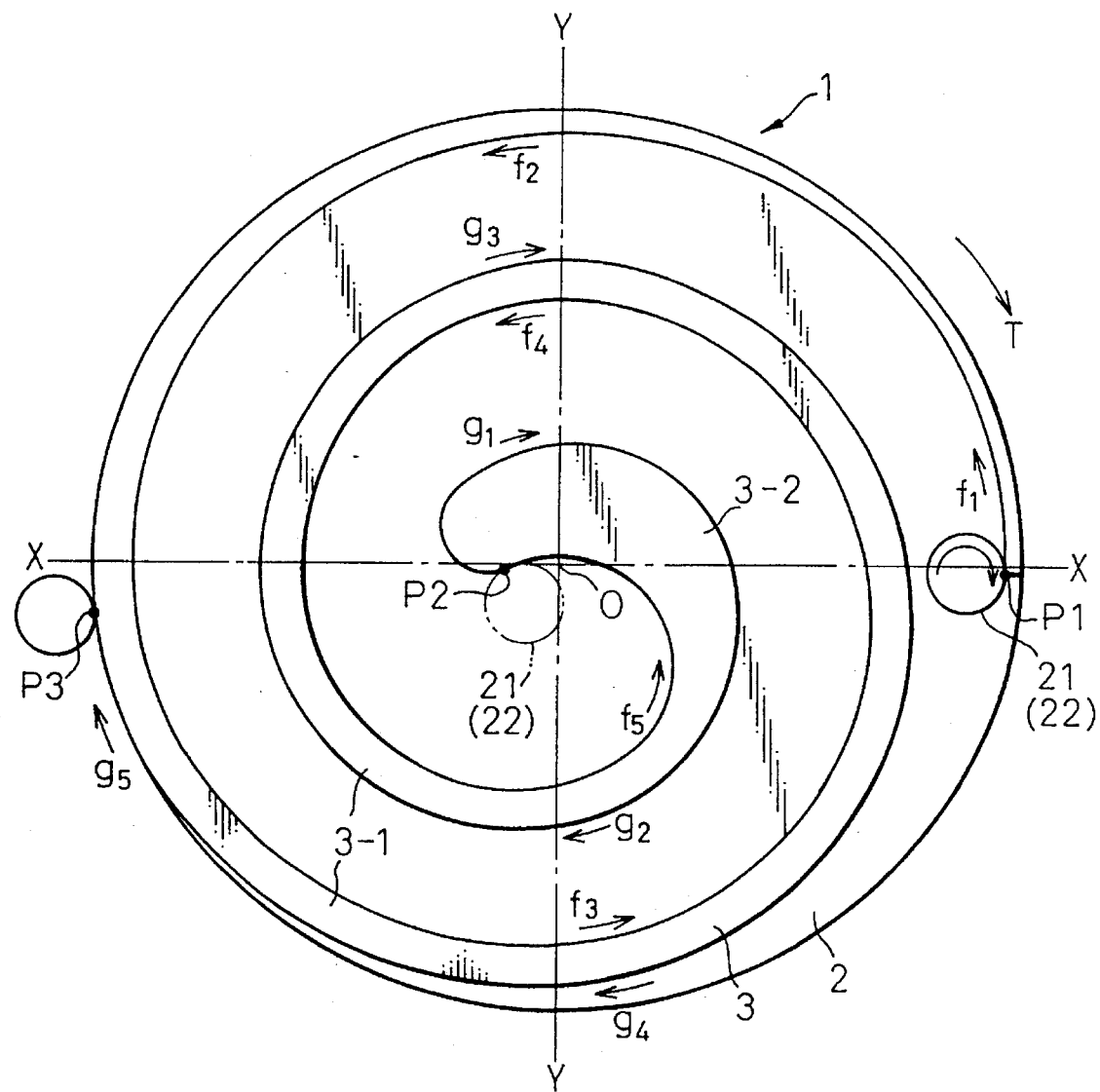

FIG. 7 is a front view of a scroll member and illustrates the movement of a tool for machining a smaller radius of curvature at the corner between the base plate and scroll wall.

Figure 8:
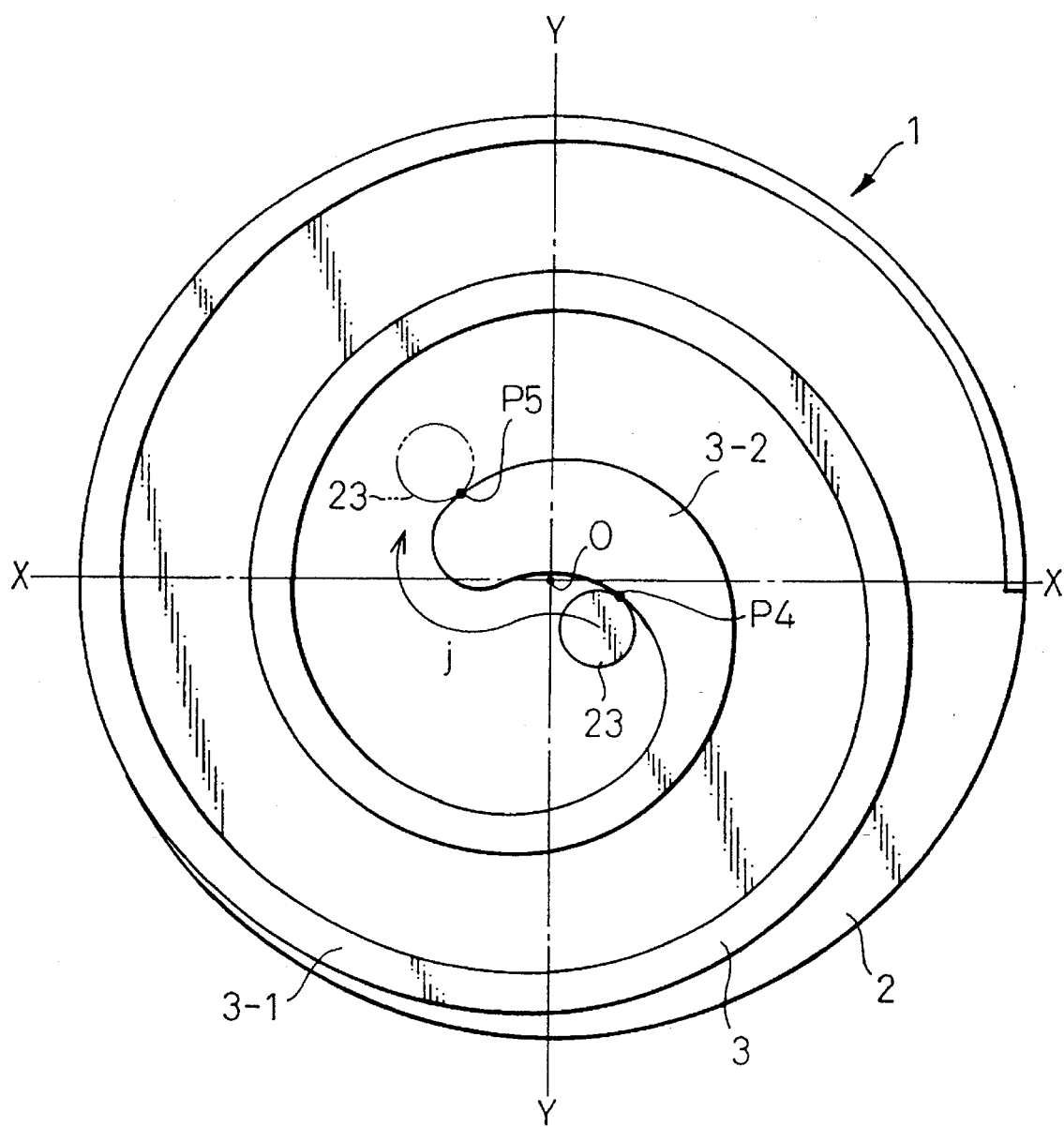

FIG. 8 is similar to FIG. 7 but illustrates the movement of a tool for machining a larger radius of curvature.

Figure 9:
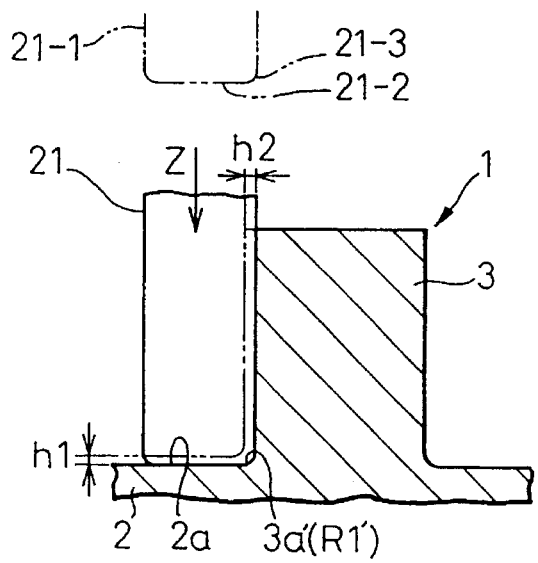

FIG. 9 illustrates the machining of the scroll member by means of a first cutting tool.

Figure 10:
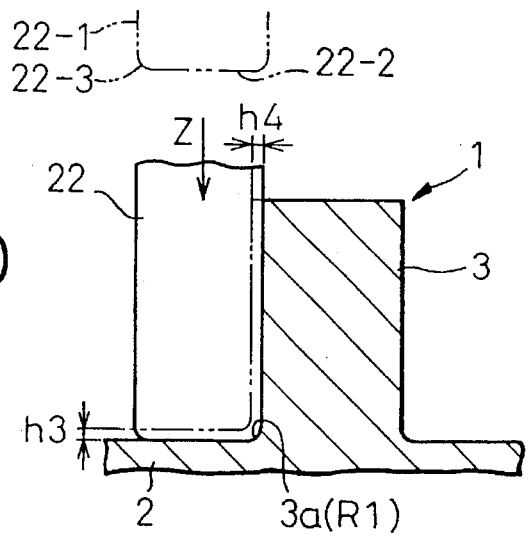

FIG. 10 is similar to FIG. 9 but illustrates the machining of the scroll member by means of a second cutting tool.

Figure 11:
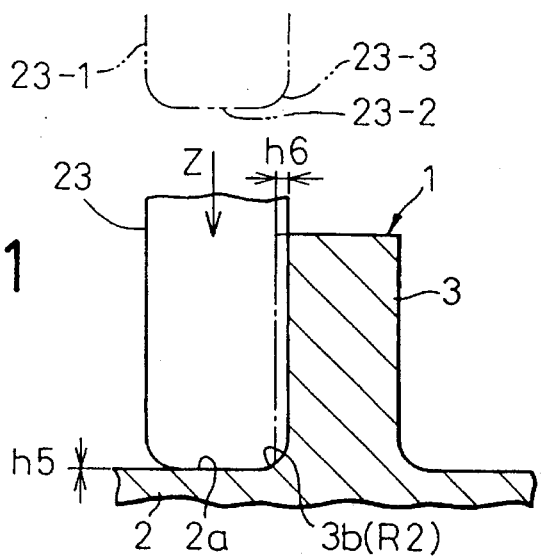

FIG. 11 is similar to FIG. 9 but illustrates the machining of the scroll member by means of a third cutting tool.

Figure 12:
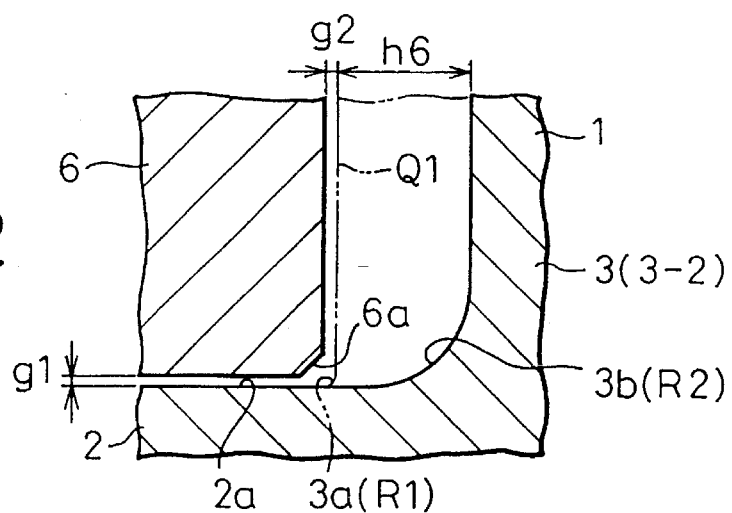

FIG. 12 illustrates two-step machining at the corner between the base plate and the scroll wall at a radially inner end hereof.

Figure 13:
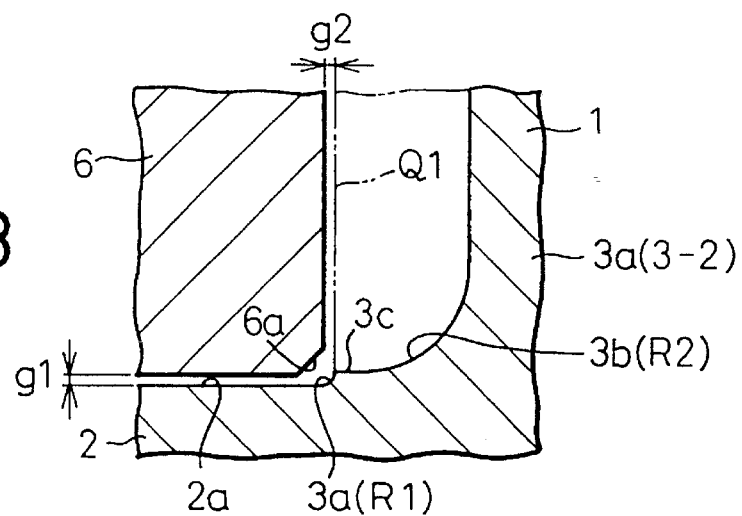

FIG. 13 is similar to FIG. 12 but illustrates an excessive feed of the tool.

Figure 14:
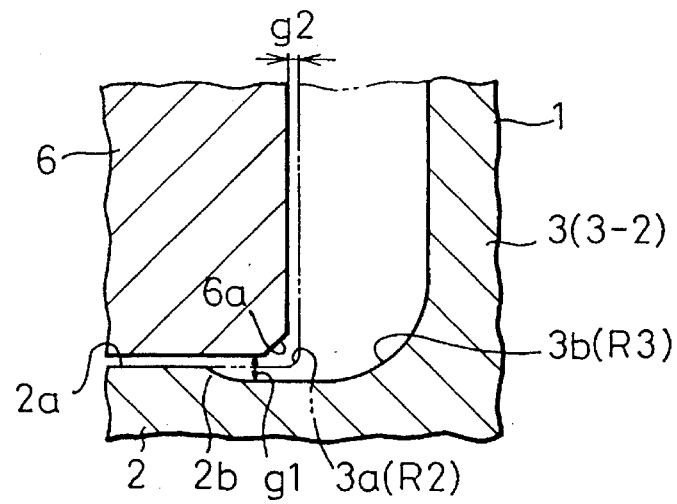

FIG. 14 is, also, similar to FIG. 12 but illustrates an insufficient feed of the tool.

Figure 15:
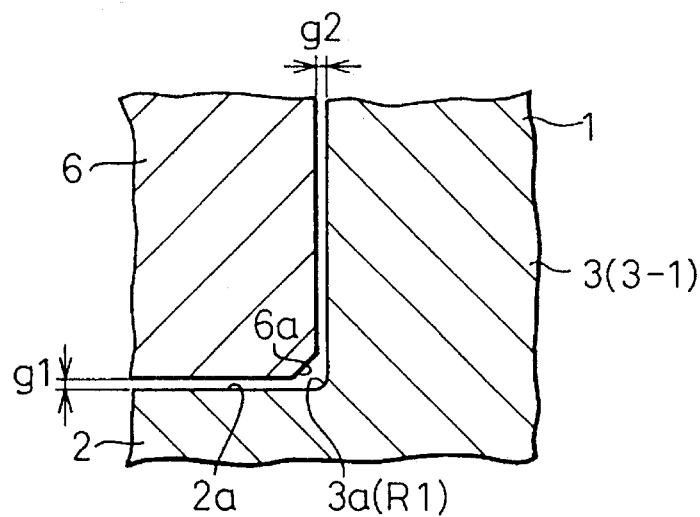

FIG. 15 illustrates machining at the corner between the base plate and scroll wall at a radially outer end thereof.

Figure 16:
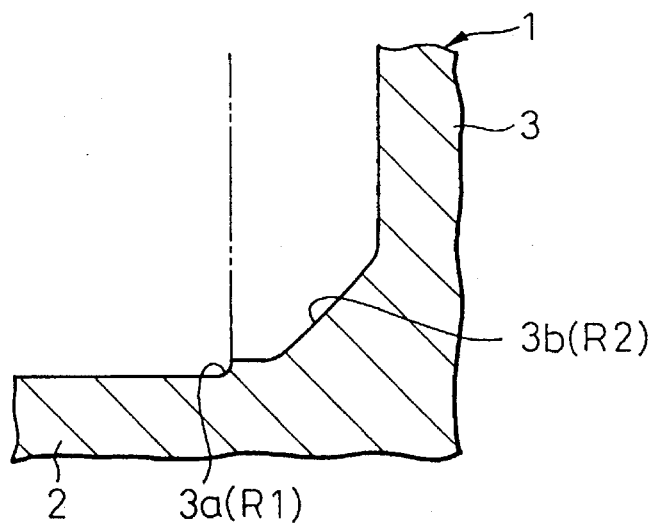

FIG. 16 is different shape of a rounded portion of a larger radius of a curvature.

Figure 17:
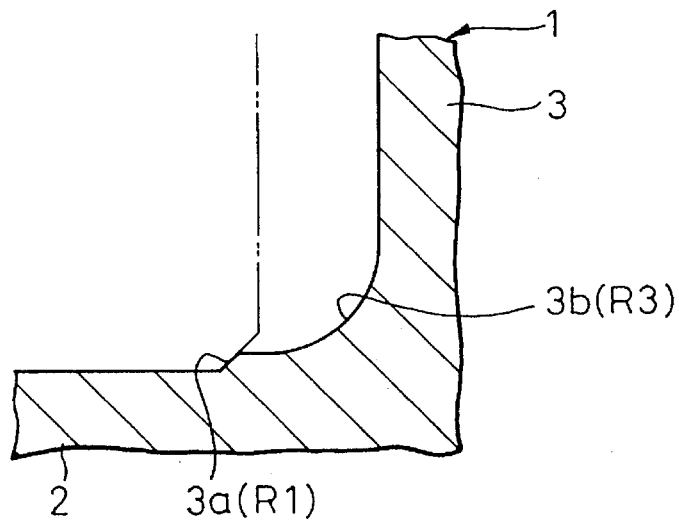

FIG. 17 is different shape of a rounded portion of a smaller radius of a curvature.

DESCRIPTION OF INVENTION

Figure 1:
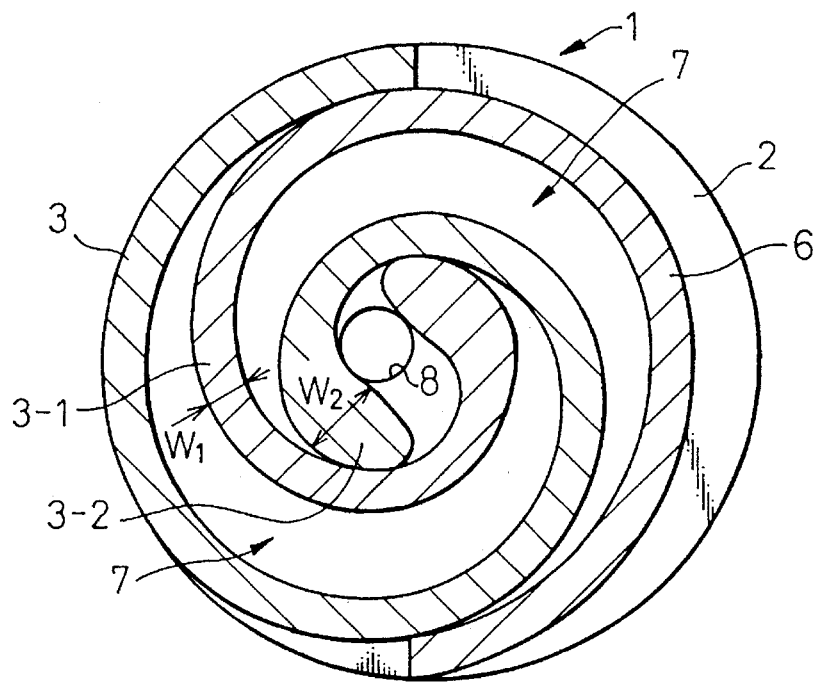
FIG. 1 is a transverse cross-sectional view of the scroll members in a scroll compressor.
Figure 2:
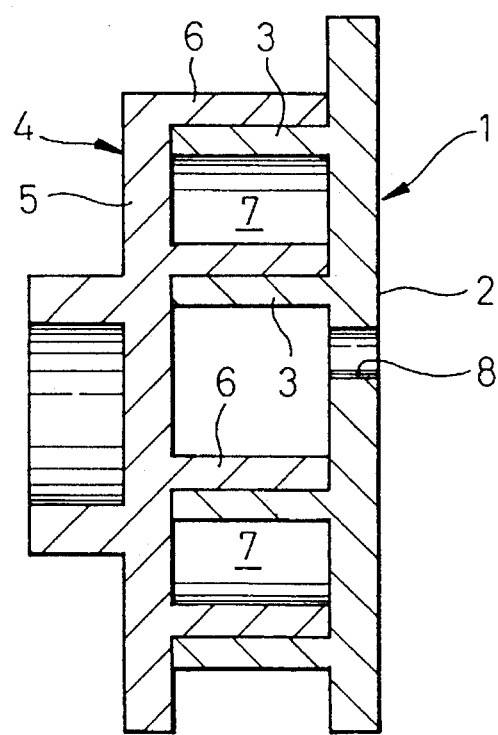
FIG. 2 is a longitudinal cross-sectional view of the scroll members in a scroll compressor in FIG. 1.

In FIGS. 1 and 2, a scroll compressor is conventionally equipped with a stationary scroll member 1 having a base plate 2 and a scroll wall 3, and a movable scroll member 4 having a base plate 5 and a scroll wall 6. The scroll walls 3 and 6 of the stationary and movable scroll members 1 and 4 are in radial contact with each other. Furthermore, the scroll wall 3 of the stationary scroll member 1 is in axial contact with the faced surface of the base plate 5 of the movable scroll member 4, while the scroll wall 6 of the stationary scroll member 4 is in axial contact with the faced surface of the base plate 2 of the movable scroll member 1. As a result, compression chambers 7 are formed between the stationary and movable scroll members 1 and 4. A well known means is provided for obtaining an orbital movement of the movable scroll member 4 with respect to the stationary scroll member 1. During the orbital movement of the movable scroll member 4, the compression chambers 7 are moved radially inwardly, while their volumes are reduced. As a result, compression of the gas in the compression chambers 7 is carried out, so that the compressed gas is discharged from an outlet 8.

In this construction of the scroll compressor, a bending moment is repeatedly applied to the scroll walls 3 and 6, during the compression operation, which may cause cracks to be generated at the corner between the base plate 2 (or 5) and the scroll wall 3 (or 6). In order to increase the durability or strength, as shown in FIG. 3, the corner the scroll wall 3 (or 6) thickened. The pressure in a compression chamber 7 increases as the latter is displaced radially inwardly. Furthermore, at a radially inner end, which is free, the stiffness of the scroll wall is reduced. In view of this, at a radially inner end 3-2, the thickness W2 of the scroll wall 3 is increased when compared with the thickness W1 of the scroll wall 3 at the radially outward position 3-1. Furthermore, the curvature R2 of the thickened portion 3b at the corner at the radially inner end 3-2 of the scroll wall is larger than the curvature R1 of the thickened portion 3a at the remaining part 3-1 thereof. As a result, the thickness of the root of the scroll wall of the root at the radially inner end 3-2 is larger than that at the remaining part 3-1, thereby increasing the stiffness.

In order to machine the corner between the scroll wall and the base plate as shown in FIG. 3, Japanese Un-Examined Patent Publication No. 4-50131 discloses a method wherein the corner is, first, machined so that a curved section 3b with a large value of the curvature R2 is formed along the entire part of the corner in the spiral direction of the scroll wall, and the corner is, then, machined so that a curved section 3a of a small value of the curvature R1 is formed only at the radially outer end 3-1 of the scroll wall. Namely, as shown in FIG. 4-A, at the portion 3-1 other than the radially inner end 3-2, the rounded portion 3b of the increased curvature is, first, machined, and then, the roundness 3a of a reduced curvature R2 is, as shown by a phantom line, machined. Thus, at the radially inner end 3-2, the cut as shown by the phantom line is not done, so that the portion 3b of the increased curvature R2 is left. In short, after the completion of the machining, at the corner between the scroll wall 3 (or 6) and the base plate 2 (or 5), a portion 3a of a small curvature R1 is obtained at the radially outer end 3-1 of the scroll wall, while a portion 3b of a larger curvature R2 is obtained at the radially inner end 3-2 of the scroll wall.

The above method for machining in the prior art makes it possible to obtain the corner of different values R1 and R2 between the radially outer and inner ends 3-1 and 3-2. Namely, in this prior art method, the machining of the entire part of the corner is, first, done to obtain a rounded surface 3b of a larger curvature R2, which is followed by machining a local part of the corner to obtain a rounded surface 3a of a smaller curvature R1 at the radially outer end 3-1 of the scroll wall. However, in such a method, the amount to be machined is increased, which causes the machining tool to be worn very rapidly, thereby causing the production cost to increase.

Furthermore, when machining the portions 3a and 3b of different curvatures on a scroll member by a cutting device, it is desirable that a scroll member is held on one and the same location on the device and that two kinds of cutters of different curvature are selectively mounted to one and the same cutter holder, thereby executing machining of the portions 3a and 3b in a sequential manner. In this case, as shown in FIG. 4-A, with respect to a surface cut by the first cutter for machining the corner of the large curvature R2, the depth h of the cut by the second cutter for machining the corner of the small curvature R1 can be maintained within a desired range. In this case, FIG. 5-A shows the relationship between the roundness 3a and the opposite scroll 6 of the movable scroll member. The scroll wall 6 has, at its edges, bevelled portion 6a for preventing the scroll wall 6 from interfering with the rounded portion 3a. In this case, a small bevelled portion 6a is sufficient for carrying out the designated function.

Contrary to this, when the portions 3a and 3b are machined by different cutting devices, a tolerance in a position of the workpiece and/or an error in a forward end position may cause the depth h of the cutting to be insufficient as shown in FIG. 4-B, thereby generating a stepped portion 3c between the portion 3b of the large radius R2 and the portion 3a of the small radius R1 as shown in FIG. 5-B. In this case, a large degree of bevelling 6a' is necessary at the faced edge portions 6a of the scroll wall 6 (or 3), in order to prevent the edge portions from interfering with the stepped portion 3c. Due to such a large degree of bevelling, the sealing of the compression chambers 7 is degraded, thereby reducing the compression efficiency of the compressor. Namely, at the portion 3-1 of the scroll wall, the compression is done, and therefore the reduced sealing may cause the compression efficiency to be reduced. Thus, in order to obtain a desired compression capacity of the compressor, an increased size of the compressor is necessary.

FIG. 6 shows an apparatus for machining the scroll members 1 and 4 in FIG. 1. In FIG. 6, a reference numeral 31 denotes a bed, on which a pair of horizontal slide members 32, which extend in parallel along X-axis, are mounted. A X-axis table 33 is mounted on the X-axis slides 32, so that the table 33 is reciprocately moved in a direction parallel to the axis X. A movable support 34 is fixed to the X-axis table 33, and a plurality of main axis units 35 are supported on the support 34 in such a manner that the main axis units 35 extend in parallel in a horizontal plane. According to the present invention, as will fully described later, different tools (milling cutters) 21, 22 and 23 are used for obtaining desired radius of a curvature at a corner between the scroll plate and the scroll wall. Namely, as shown in FIG. 9, the tool 21 is for rough machining a roundness 3a' of a radius of R1' at the corner between the base plate and the scroll wall along the entire part in the scroll direction. The tool 21 has side cutting edges 21-1 for machining a side wall of the scroll wall 3 (or 6), and has at its axial end edges 21-2 for machining the bottom surface of the base plate 2 (or 5) of the scroll member. The tool 21 is further provided with a circumferential edge 21-3 having a radius corresponding to the radius R1' of the corner portion 3a' to be machined. As shown in FIG. 10, the tool 22 is for fine machining a roundness 3a of a radius of R1 at the corner between the base plate and the scroll wall also along the entire part in the scroll direction. The tool 22 has side cutting edges 22-1 for machining a side wall of the scroll wall 3 (or 6), and has, at its axial end, edges 22-2 for machining the bottom surface of the base plate 2 (or 5) of the scroll member. The tool 22 is further provided with a circumferential edge 22-3 having a radius corresponding to the radius R1 of the portion 3a of the corner to be machined. Finally, as shown in FIG. 11, the tool 23 is for fine machining a roundness 3b of a radius of R2 at the corner between the base plate and the scroll wall only at the radially inner part of the scroll wall. The tool 23 has side cutting edges 23-1 for machining a side wall of the scroll wall 3 (or 6), and has at its axial end edges 23-2 for machining the bottom surface of the base plate 2 (or 5) of the scroll member. The tool 23 is further provided with a circumferential edge 23-3 having a radius corresponding to the radius R2 of the portion 3b of the corner to be machined. In FIG. 6, these tools 21, 22 and 23 are mounted to the respective main axis units 35.

A pair of Z-axis slides 36 are mounted on the bed 31, so that the slides 36 extend in parallel in a horizontal plane, while extending in a direction which is transverse to the direction of the X-axis slides 32. A Z-axis table 37 is mounted on the Z-axis slides 36, so that the table 37 is reciprocated along the direction of the Z-axis. A column 38 is fixed to the upper surface of the Z-axis table 37. A pair of Y-axis slides 39 is mounted on a front vertical surface of the column 38, so that the slides 39 extend vertically in parallel along the direction of Y, which is transverse to both of the X and Z directions. A Y-axis table 40 is connected to the Y-axis slides 39, so that the table 40 is reciprocated along the axis Y. A rotary table 42 is mounted on the front surface of the Y-axis table 40, so that the rotary table 42 is rotated about an axis 0. A workpiece chuck 41 is mounted on the rotary table 42. It should be noted that the axis 0 of the rotation of the workpiece chuck 41 is parallel to the axis of the main axis units 35. As a result, the workpiece chuck 41 is reciprocally rotated by the rotary table 42 as shown by an arrow T.

A computer control circuit (not shown) is provided for executing a control of reciprocal linear moment of the tools 21, 22 and 23 in the direction of X-axis, a control of reciprocal linear movement of the workpiece chuck 41 for holding the scroll member 1 or 4 in a direction of Y-axis or Z axis, and a control of reciprocal rotating movement in a direction of T. Namely, the control circuit is provided therein with numerical control programs for executing the above-mentioned controls independently. Namely, upon the execution of the programs, respective control signals are issued to respective actuators (not shown).

Now, a process for machining the roundness 3a and 3b at the corner between the base plates 2 and 5 and the scroll walls by using the cutters 21 to 23 will be explained with reference to FIGS. 6 to 11. FIGS. 9 to 10 illustrate a sequence of the machining of the scroll member at the radially inner end 3-2 (FIG. 3) of the scroll wall of increased width using the three cutters 21, 22 and 23. The device for shaping in FIG. 6, a scroll member 1 (or 4) as a workpiece is, at its base portion 2 (or 5), held by the workpiece chuck 41 of the shaping device. FIG. 7 is a front view of the workpiece as held by the workpiece chuck 41 of the shaping device. The tool 21 is located to a point P1 adjacent the radially outward position of the scroll wall 3, while the tool is rotated. The scroll member 1 is moved in the Z-axis direction, i.e., the direction transverse to the plane of paper of FIG. 6. As a result, the tool 21 is moved axially toward the workpiece (scroll member 1) as shown by an arrow Z in FIG. 9, so that a cut of a depth of h1 in an axial direction (Z-direction) is obtained. Simultaneously, in a direction transverse to the Z direction (X-direction), a cut of a depth h2 is given. As a result, the side cutting edges 21-1 machines the side surface of the scroll wall 3 of the scroll member, while the axial end cutting edges 21-2 machines the bottom wall of the base plate 2 of the scroll member. Furthermore, the circumferential edge 21-3 machines the corner between the base plate and the scroll wall so as to provide a rounded portion 3a' of a radius a R1'.

Then, based on programs stored in the control device (not shown), a numeral control for a linear movement of the rough cutting tool 21 in the X-axis direction, a numeral control for a rotating movement of the workpiece (scroll member 1 or 4) about an axis 0 as shown by an arrow T, and a numeral control for a linear movement of the workpiece in the Y-axis direction are executed. A combination of these three kinds of the numerical controls are such that the rough cutter 21 moves from the radially outward initial position P1 moves along the scroll direction to a radially inward position P2 adjacent the inner end of the scroll wall of an increased width. In other words, the rough cutting tool 21 moves as shown by arrows $f_1$, $f_2$, $f_3$, $f_4$ and $f_5$ in FIG. 7, so that a cut of the bottom wall of the base plate of the depth of h1 by means of the cutting edges 21-1 as well as a cut of the side wall of the scroll wall of the depth of h2 by means of the cutting edges 21-2 are maintained. Thus, a machining of the rounded portion 3a' of a curvature of R1' by means of the edges 21-3 is also maintained at the corner between the base plate 2 and the scroll wall 3.

When a relative movement of the cutter 21 with respect to the workpiece 1 to the radially inner position P2 is completed, a reverse rotating movement of the workpiece 1 in a direction opposite the arrow T is generated, to which a linear movement of the rough cutting tool 21 in the X-axis direction and a linear movement of the workpiece in the Y-axis direction are combined, so that the rough cutter 21 from the radially inward position P2 moves along the scroll direction to a radially outward position P3, as shown by arrows $g_1$, $g_2$, $g_3$, $g_4$ and $g_5$ in FIG. 7. In this case, the depth h1 of the cut to the bottom surface of the base plate 2 as well as the depth h2 of the cut to the side surface of the scroll wall 3 are maintained and, thereby, a first stage rough machining of the scroll member is completed.

Then, by using the tool 22 for fine cutting, a machining of the entire part of the workpiece 1 is done in a way similar to the rough machining. Namely, the tool 22 is located to the point P1 in FIG. 7, the scroll member 1 is moved in the Z-axis direction, so that a cut of a depth of h3 in Z-axis direction (Z-direction) is obtained. Simultaneously, in the X-axis direction, a cut of a depth h4 is given. As a result, the side cutting edges 22-1 machines the side surface of the scroll wall 3 of the scroll member, while the axial end cutting edges 22-2 machines the bottom wall of the base plate 2 of the scroll member. Furthermore, the circumferential edge 22-3 machines the corner between the base plate and the scroll wall so as to obtain a rounded portion 3a of a radius a R1.

Then, based on stored numerical programs, a linear movement of a tool along X-axis of the workpiece, a rotating movement as shown by the arrow T and a linear movement along Y-axis of the workpiece are combined such that the fine cutter 22 from the position P1 to the position P2 as shown by arrows $f_1$, $f_2$, $f_3$, $f_4$ and $f_5$, then from the position P2 to position P3 as shown by arrows $g_1$, $g_2$, $g_3$, $g_4$ and $g_5$ in FIG. 7. As a result, a fine machining of the workpiece of the depth h3 of the cut to the bottom surface of the base plate 2 by the cutting edge 22-1 as well as the depth h4 of the cut to the side surface of the scroll wall 3 by the cutting edge 22-2 along the entire part of the workpiece is completed. Simultaneously, a machining of the rounded portion 3a of a curvature of R1 by means of the edges 22-3 is also done at the corner between the base plate 2 and the scroll wall 3.

In this case, during the rough cut, the value of the depth h1 of the cut is within a range between 150 and 1000 μm, and the value of the depth h2 of the cut is within a range between 150 and 1000 μm. During the fine cut, the value of the depth h3 of the cut is within a range between 20 and 50 μm, and the value of the depth h4 of the cut is within a range between 20 and 50 μm. Furthermore, the rotational speed of the cutter 21 and 22 is 20,000 r.p.m. The speed of the feed of the cutter 21 during the rough cutting is within a range between 1,000 to 2,000 mm/min, while the speed of the feed of the cutter 22 during the fine cutting is about 4,000 mm/min.

Now, a machining of the scroll member at the radially inner end 3-2 will be explained. As shown in FIG. 1, at the radially inner end 3-2, the scroll wall 3 (or 6) has an increased thickness W2 over the remaining part of the scroll wall for increasing the mechanical strength of the scroll wall. Furthermore, as shown in FIG. 3, at the radially inner end 3-2 of the scroll wall, at the corner between the base plate 2 (or 5) and the scroll wall 3 (or 6), a rounded portion 3b of an increased radius is provided, thereby increasing the thickness of the scroll wall at the corner, thereby also obtaining an increased strength.

As shown in FIG. 8, the scroll member 1 (or 4) as a workpiece is held by the chuck 41, while the cutter 23, being rotated, is situated at the location P4, which is adjacent to the inner radial end 3-2 of the scroll wall. As shown in FIG. 11, a movement of the workpiece (scroll member 1) along the Z-axis (the direction transverse to the plane of the paper of FIG. 8) is obtained so that a depth h5 of a cut is obtained at the bottom surface 2a of the base plate 2 of the scroll member by means of the axial end cutting edges 23-2 of the tool 23, while a depth h6 of a cut is obtained at the side wall of the scroll wall 3 of the scroll member by means of the side cutting edges 23-1 of the third tool 23. Furthermore, the corner between the base plate 2 and scroll wall 3 is cut to a rounded portion of a radius of R2 by means of the circumferential edges 23-3 of the tool 23. Then, a numerical controlled movement of the cutter 23 in X-axis and a numerical controlled movement of the scroll member 1 (workpiece) are obtained, while keeping the scroll member 1 still, so that a relative movement between the tool 23 and the scroll member 1 from the initial position P4 to a position P5 is obtained along the radially inner end portion 3-2 of the scroll wall 3 as shown by an arrow j is obtained. As a result, at the radially inner end portion of the scroll wall 3, a cut of the depth of h5 at the bottom surface 2a of the base plate 2 as well as a cut of the depth of h6 at the side surface of the scroll wall 3 are obtained, while at the corner between the base plate 2 and the scroll wall 3, a rounded portion 3b of a radius R2 is obtained. In this case, the rotating speed of the cutter 23 was 20,000 r.p.m., and a speed of the feed of the cutter 23 was 2,000 mm/min, and the cutting depth h6 was 200 to 600 μm.

In the above embodiment, the value of the curvature R1 (=R1') is, for example, in a range between 0.05 to 0.3 mm, and the value of the curvature R2 is, for example, in a range between 0.8 to 1.0 mm. Furthermore, the machining of the movable scroll member 4 is similarly done.

According to the above embodiment of the present invention, as explained above, at the portion (radially outer end) 3-1 of the scroll wall of the reduced thickness W1 (FIG. 1), the rough cutter 21 is, first, used to obtain a rough machining of the scroll wall 3 and the base plate 2 together with the rounded root portion 3a' of a radius R1'. Then, the fine cutter 22 is used to obtain a fine machining of the scroll wall 3 and the base plate 2 together with the rounded portion 3a of the radius R1. In such a two stage machining, a major part of the machining (cutting depth) is allocated to the rough cutter 21. In other words, the fine cutter 22 removes only a minor part of the cutting depth. As a result, a cutting resistance force during the fine cutting by the cutter 22 is reduced, thereby enhancing the service life of the fine cutter 22. Finally, the cutter 23 is used only at the radially inner end 3-2 of the scroll wall of the increased thickness W2, in order to machine the scroll wall 3 and base plate 2 together with the corner portion 3b of the increased curvature (R2). Since the cutter 23 is used only at the radially inner end 3-2 of the scroll wall, an increased service life is obtained.

FIGS. 12 to 15 show different machined profiles of the corner between the base plate 2 and scroll wall 3 of the scroll member 1 at the radially inner end 3-2 of the scroll after the machining of the rounded portion 3b of the increased curvature has been completed. In FIGS. 12 to 15, the phantom line Q1 shows the machined surface as obtained by the second tool 22. Therefore, for the radially outward end 3-1 of the scroll wall of the reduced thickness, the phantom line Q1 corresponds also to the finally machined side surface after the completion of the machining by means of the second tool 22. In an assembled state, the scroll wall 6 of the movable scroll member 4 is located adjacent the scroll wall 3 of the stationary scroll member 1, and a distance g2 between the scroll wall 6 and the plane Q1 corresponds to a gap between the side surfaces of the scroll walls 3 and 6, at their radially outer ends.

During the machining of the rounded corner 3b of the increased curvature 3b at the radially inner end 3-2 of the scroll wall 3, a setting of a feed of the cutter 23 along the Z-axis is such that the axial end surface of the cutter 23 coincides with the inner surface 2a of the base plate 2 of the scroll member 1. After the completion of the machining by means of the tool 23, the cut surface with the rounding 3b of the curvature R2 is, theoretically, smoothly connected to the cut surface with the rounding 3a of the curvature R2 by means of the tool 22, as shown in FIG. 12.

When the attachment of the workpiece 1 is within a permissible error, a variation of the feed of the cutter 23 between cycles of the operation is smaller than 10 μm, and is usually within a range of ±2 to 3 μm. When the variation is in a range of −2 to −3 μm, a stepped portion 3c is formed between the cut surface by the tool 22 (the rounded portion 3a) and the cut surface by the tool 23 (the rounded portion 3b). However, the existence of such a stepped portion 3c does not make it necessary to increase a degree of the bevelling 6a at the edges of the scroll wall 6 of the movable scroll member 4, due to the fact that the stepped portion 3c is formed on the phantom line Q1 corresponds to the cut surface by the second tool 22, which is inwardly spaced from the side surface of the scroll wall 6 for a value corresponding to the gap g2. When the variation is in a range of +2 to +3 μm, a stepped portion 2b is formed between the cut surface by the tool 22 (the base plate surface 2a) and the cut surface by the tool 23 (the rounded portion 3b), as shown in FIG. 14. However, the existence of such a stepped portion 2b also does not make it necessary to increase a degree of the bevelling 6a at the edges of the scroll wall 6 of the movable scroll member 4. In view of the above, according to the present invention, a strict control of the depth of the feed h1, h3 and h5 of the cutters 21, 22 and 23 toward the base plate 2 can be avoided, which makes it possible to increase a productivity during the machining process. However, in order to avoid the cutting as shown in FIG. 14 being done, it is desirable that the depth of the feed of the cutter 23 is set such that the stepped portion 3c between the machined surface by the tool 22 (the rounded portion 3a) and the machined surface by the tool 23 (the rounded portion 3b) as shown in FIG. 13 is obtained.

As explained above, a cut of the depth of h6 by the tool 23 is done only at the inner end 3-2 of the scroll wall. In other words, an increased clearance between the scroll walls 3 and 6 of g2+h6 is obtained at the radially inner ends 3-2 of the scroll wall as shown in FIG. 12. However, the increased clearance between the scroll walls 3 and 6 does not cause the sealing performance to be substantially worsened. Namely, at the radially inner end 3-2, the scroll wall is slightly spaced from the involute curve, which makes a gap to be essential with respect to the faced scroll wall. In other words, a total design of the compressor is determined from the beginning such that a desired seal performance is obtained despite the existence of such a gap. Thus, a slight increase in the gap does not matter to the total sealing performance.

FIG. 15 shows a relationship between the bevelled portion 6a of the scroll wall 6 of the movable scroll member with respect to the rounded corner portion 3a of the stationary scroll member at the portion 3-1 (radially outer end of the scroll wall 3). In this case, only a close gap g2 is left between the faces surfaces, while the small degree of the bevelling 6a is sufficient for preventing the bevelled portion from being interfered with the rounded portion 3a.

When the machining is done by a different machining apparatus by connecting the scroll member 1 to its chuck, a variation in the depth h5 of the cut to the base plate 2 by means of the tool 23 in the Z-axis is increased. However, according to the present invention, such an increased variation of the depth of the cut by the tool 23 does not matter as far as an interference of the edges of the scroll wall 6 of the mated scroll member 4 is concerned, as explained with reference to FIGS. 12 to 14. In short, according to the present invention, a desired sealing performance is obtained, while eliminating the necessity of a strict control of the precision of the attachment of the workpiece to the holder of the shaping machine.

It should be noted that, for obtaining a machining of the roundness R2 of the increased curvature by means of the cutter 23, only a numerical control along the X-axis of the cutter 23 and a rotating movement T of the workpiece 1 are combined, while eliminating the control in the Y-axis. However, an addition of the Y-axis control of the cutter 23 is desirable for increasing the precision, since it becomes possible that a 90 degree face to face contact of the cutter 23 with respect to the side surface of the scroll wall 3 is always maintained.

When a service life of the cutter 22 or 23 ends, it is changed for a new one, which is attached to the shaping machine, which inevitably-generates an error in the attached position. In order to compensate such an error, the position of the newly attached cutter is measured, and a compensation of the feed of the cutter along the Z-axis direction is done in accordance with the measured error.

It should further be noted that the radius of the circumferential edge 22-3 of the fine cutter 22 can be slightly larger than the radius of the circumferential edge 21-3 of the rough cutter 21, so long as an unmachined portion is not generated during the fine cutting. However, it is possible that the radius of the circumferential edge 22-3 of the fine cutter 22 is made equal to the radius of the circumferential edge 21-3 of the rough cutter 21. In this case, the worn fine cutter 22 can be re-used as a rough cutter.

A machining of a roundness 3a' or 3a by means of the cutter 21 or 22 can be done by numerical controls which are opposite with respect to those as described with reference to FIGS. 7 and 8.

In case where the scroll member 1 or 4 is made from an aluminum alloy including a high percentage of silicon or cast steel, it is desirable that the cutter 21, 22 and 23 are made from an ultra hard alloy such as a tungsten carbide. It is also desirable to form a coating of titanium nitride (TIN) on cutting wedges of the cutter in order to reduce a cutting resistance force.

As shown in FIG. 16, the cross sectional shape of the larger thickened portion 3b can be flattened. Similarly, as shown in FIG. 17, the cross sectional shape of the smaller thickened portion 3a can be flattened. Furthermore, the shapes in FIGS. 15 and 16 can be combined.

We claim:

1. Method for machining a scroll wall having a base plate and a scroll wall extending axially from the base plate, the scroll wall also extending, in a spiral direction, from a radially outer end and a radially inner end, so that a corner is formed between scroll wall and the base plate along the spiral direction, said method comprising steps of:

machining the corner along the entire length of the scroll wall along the spiral direction, so that the corner is machined to a rounded shape of a first radius of a curvature, and;

after the completion of the machining of the first value of radius of a curvature, machining the corner only at the radially inner end, so that the corner is machined to a rounded shape of a second radius of a curvature, which is larger than the first radius of a curvature.

2. A method according to claim 1, wherein at least one said rounded portions at the radially inner and outer ends of the scroll wall is flattened one.

3. Method for machining a scroll wall having a base plate and a scroll wall extending axially from the base plate, the scroll wall also extending, in a spiral direction, from a radially outer end and a radially inner end, so that a corner is formed between scroll wall and the base plate along the spiral direction, said method comprising steps of:

providing means for holding the scroll member;

providing a first cutting tool for machining a radius of curvature;

providing a second cutting tool for machining a radius of curvature, which is larger than that of the first cutting tool;

machining, by using a first cutting tool, the corner along the entire length of the scroll wall along the spiral direction, so that the corner is machined to a radius of curvature corresponding to that of the first tool, and;

after the completion of the machining by the first tool, machining, by using the second tool, the corner only at the radially inner end, so that the corner is machined to a radius corresponding to that of the second cutting tool.

4. Method for machining a scroll wall having a base plate and a scroll wall extending axially from the base plate, the scroll wall extending, also, in a spiral direction, from a radially outer end and a radially inner end, so that a corner is formed between scroll wall and the base plate along the spiral direction, said method comprising steps of:

providing means for holding the scroll member;

providing a first cutting tool for machining a roundness of a radius of curvature;

providing a second cutting tool for machining a roundness of a radius of curvature, which is larger than that of the first cutting tool;

providing means for attaching the tool so that it faces the scroll wall;

attaching the first cutting tool to the tool attaching means;

machining, by using a first cutting tool, the corner along the entire length of the scroll wall along the spiral direction, so that the corner is machined to a radius of curvature corresponding to that of the first tool, and;

after the completion of the machining by the first tool, attaching the second tool to the tool attaching means, while the attachment of the scroll member to the holding means is maintained, and machining, by using the second tool, the corner only at the radially inner end, so that the corner is machined to a radius corresponding to that of the second cutting tool.

5. A method for machining a scroll wall having a base plate and a scroll wall extending axially from the base plate, the scroll wall extending, also, in a spiral direction, from a radially outer end and a radially inner end, so that a corner is formed between scroll wall and the base plate along the spiral direction, said method comprising the steps of:

rough machining the corner along the entire length of the scroll wall in the spiral direction, so that the corner is machined to a first radius of curvature, and;

fine machining the corner along the entire length of the scroll wall along the spiral direction, so that the corner is machined to a second radius of curvature, which is substantially the same as that of the first radius of curvature, and;

after the completion of the fine machining of the first value of radius of a curvature, machining the corner only at the radially inner end, so that the corner is machined to a second radius of curvature, which is larger than the first radius of curvature.

* * * * *